United States Patent [19]
Oldford

[11] 3,838,485
[45] Oct. 1, 1974

[54] METHOD OF MAKING A PULLEY CONSTRUCTION

[75] Inventor: William G. Oldford, Lexington, Mich.

[73] Assignee: Huron Tool & Manufacturing Division of U.S. Industries, Inc., Lexington, Mich.

[22] Filed: May 10, 1973

[21] Appl. No.: 358,918

[52] U.S. Cl.............. 29/159 R, 29/159.01, 29/417, 74/230.3
[51] Int. Cl....... B21d 53/26, B21k 1/28, B21k 1/42
[58] Field of Search.......... 29/159 R, 159.1, 159.01, 29/416, 417, DIG. 3, DIG. 32; 74/230.3

[56] References Cited
UNITED STATES PATENTS

| | | | |
|---|---|---|---|
| 1,698,083 | 1/1929 | Booth | 29/159.1 |
| 1,753,586 | 4/1930 | Warwick | 29/159.1 |
| 2,065,275 | 12/1936 | Hester | 29/159.01 X |
| 2,283,918 | 5/1942 | Dekome | 29/DIG. 3 |
| 2,730,795 | 1/1956 | Bloss | 29/159 R |

Primary Examiner—Charles W. Lanham
Assistant Examiner—Victor A. DiPalma
Attorney, Agent, or Firm—Harness, Dickey & Pierce

[57] ABSTRACT

A pulley construction and method wherein a longitudinal groove is formed in an advancing metal strip, the strip is coiled into a plurality of convolutions and each convolution is severed from the strip. The ends of each severed convolution are aligned and secured together to provide a continuous circular rim having an outwardly facing circumferential groove for a drive belt. The rim may be assembled onto a hub to complete the pulley construction, and in one embodiment the hub and rim have a press fit engagement. In another embodiment of the invention, the pulley rim comprises matingly engageable semi-circular sections of convolutions. These sections are received between two diverging circumferential rows of tabs extending around the periphery of the hub and defining a radially outwardly open rim receiving section or annulus which receives the rim sections. Other embodiments of the invention disclose rims having single or multiple grooves, and various hub constructions.

20 Claims, 9 Drawing Figures

PATENTED OCT 1 1974 3,838,485
SHEET 1 OF 2
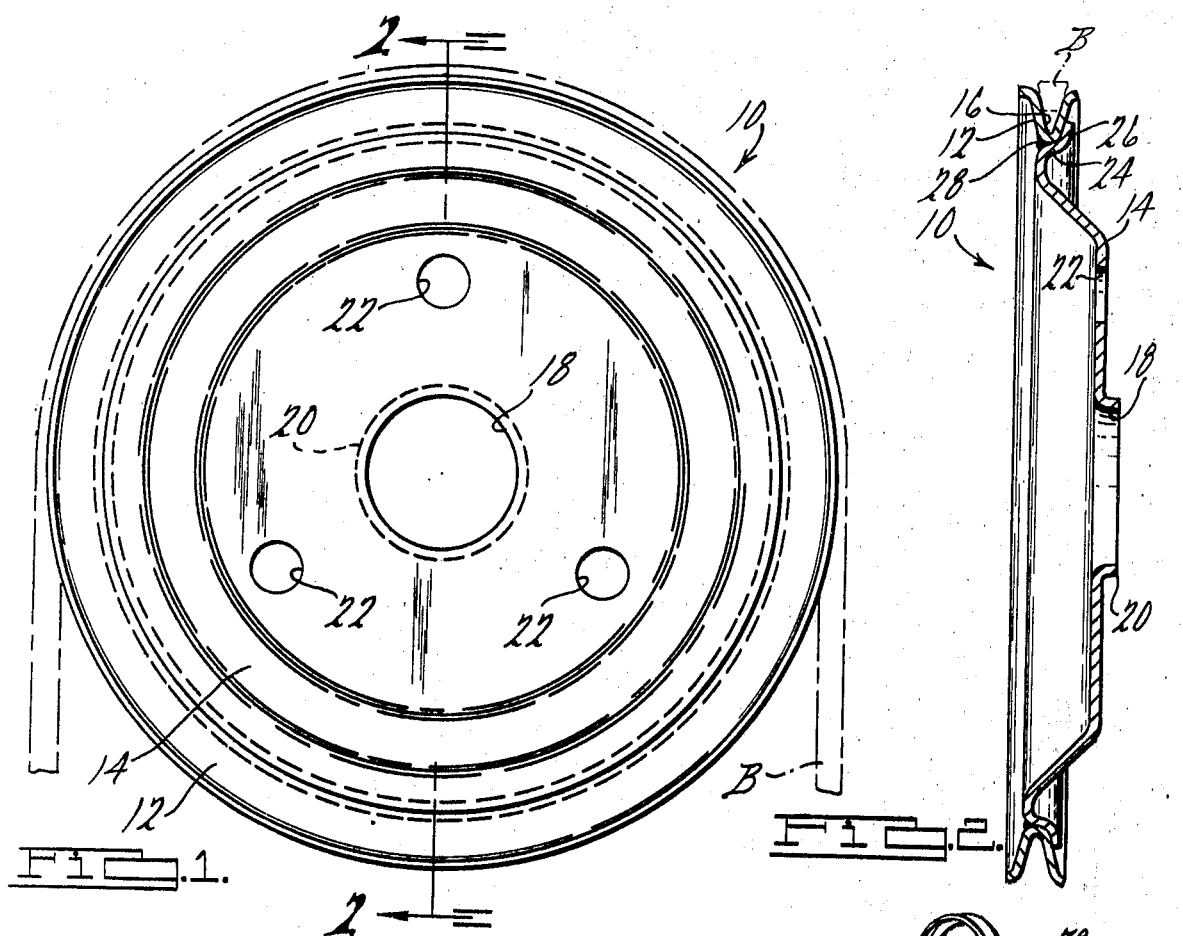
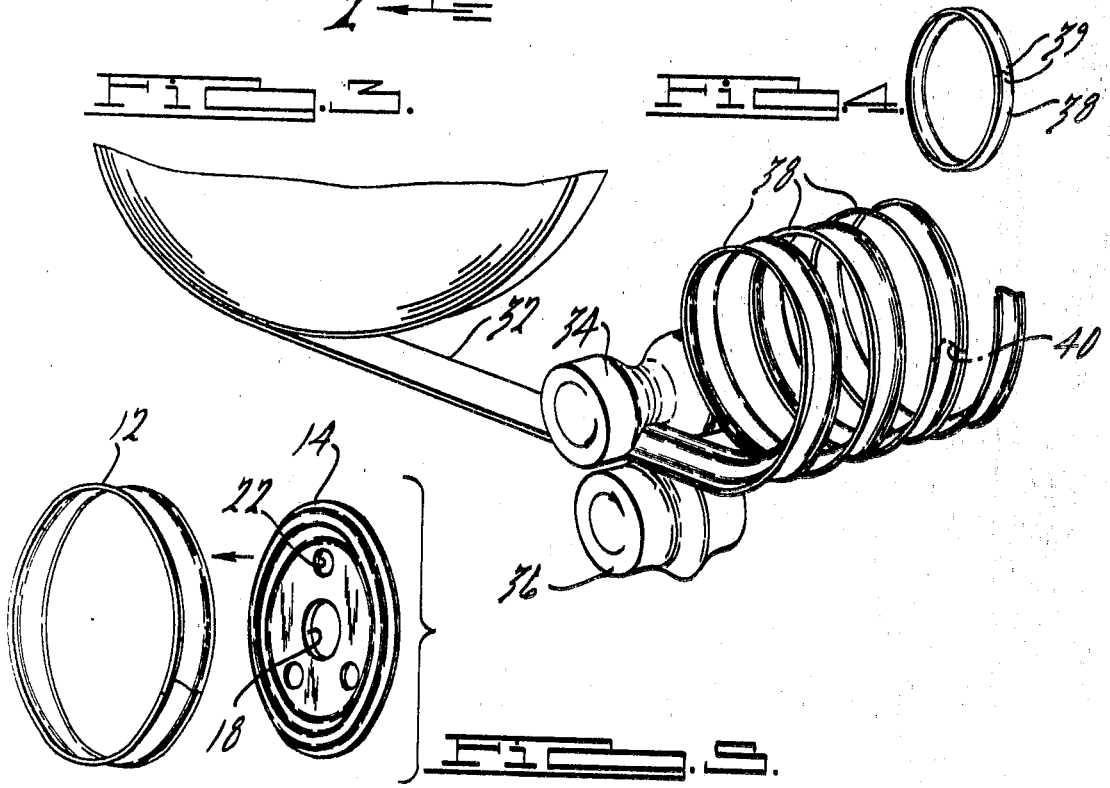

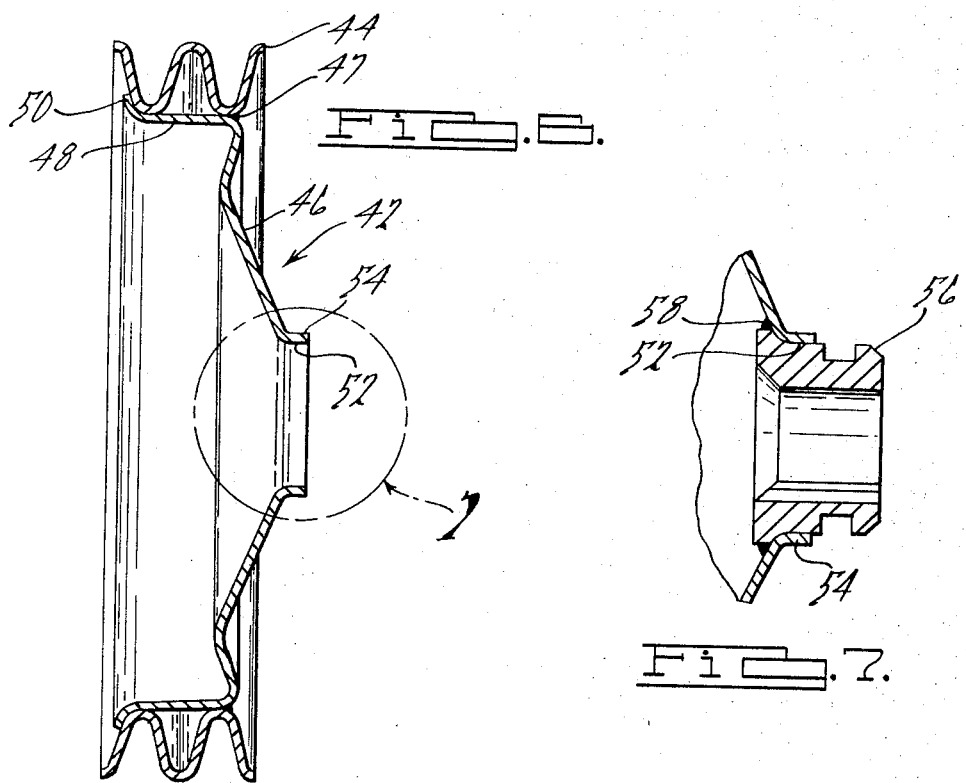
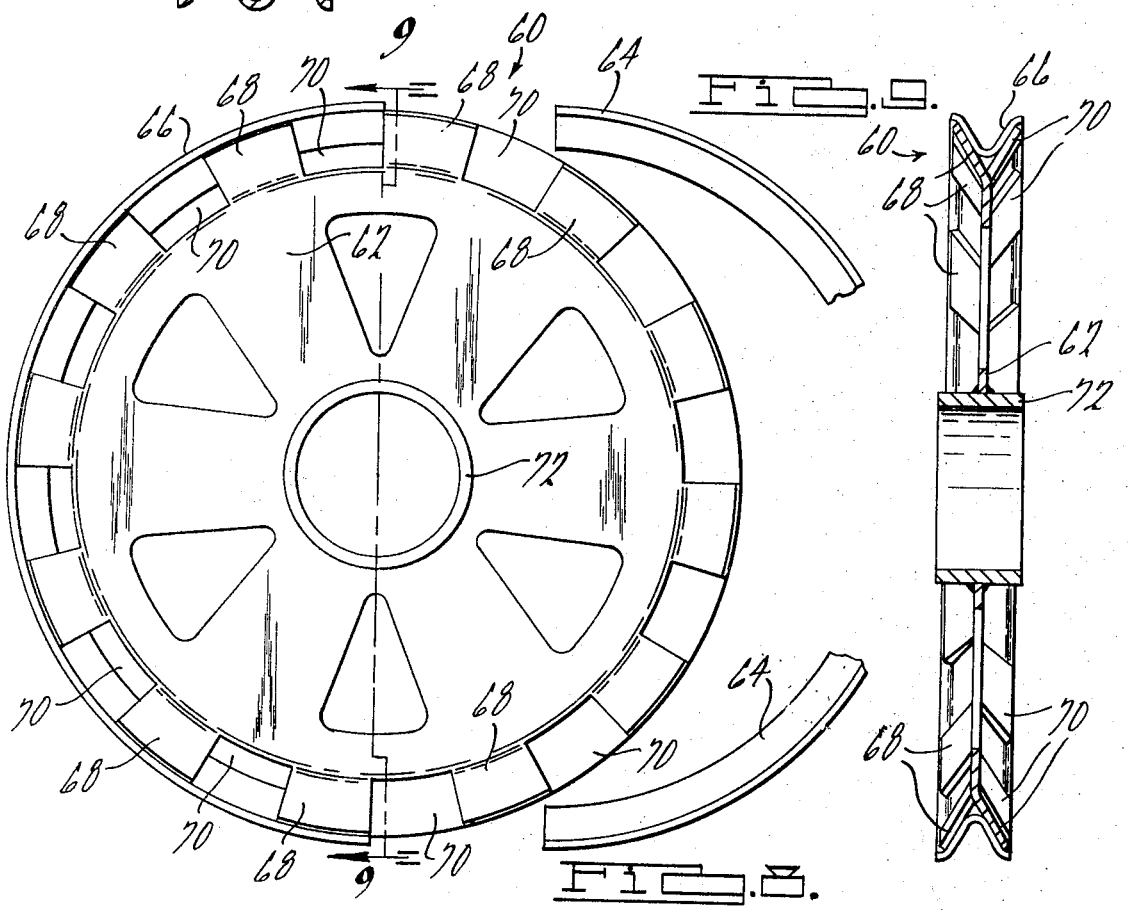

METHOD OF MAKING A PULLEY CONSTRUCTION

BACKGROUND AND SUMMARY OF THE INVENTION

The present invention relates to pulleys and methods of their manufacture.

The prior art includes various methods of making pulleys, or sheaves, such as those which are often used on automobile engines and related accessories which are powered via drive belts from the engine. One type of pulley construction and method provides a one-piece metal pulley wherein the outer periphery of a blank is folded onto the central hub portion of the blank and the pulley groove is fashioned in the outer margin of the blank. This method requires relatively complicated tooling and hence a relatively large capital investment. Moreover, pulley blanks must be individually processed through the manufacturing operation, and this further complicates the process.

In contrast to the prior art, the present invention provides a pulley construction and method wherein the pulley rim is made from an advancing metal strip in which one or more longitudinal grooves are formed. The strip is coiled into a plurality of convolutions which are successively individually severed from the strip. The ends of each severed piece are secured together, as by welding, brazing, etc., to form a rim. The method can be practiced with a minimum capital outlay and can provide high production efficiency. Furthermore, the method is highly versatile and permits changes in pulley design to be made without a great deal of changes having to be made to the tooling. In one embodiment of the invention a complete convolution may be severed from the strip and the adjacent ends thereof aligned and secured together to provide a one-piece pulley rim. In another embodiment only fractions of a complete convolution are cut from the strip and matching fractional sections are secured together to form a complete rim. The pulleys constructed in accordance with the invention can have single or multiple grooves, single or multiple piece rims, and various hub configurations.

Therefore, among the objects of the present invention are: to provide a novel pulley construction and method which can be economically practiced, is highly versatile, is efficient for mass production application, which reduces capital outlay and which represents an important and highly advantageous improvement over prior art methods and constructions.

The foregoing objects as well as additional features, benefits and advantages of the invention will be seen in the ensuing description and claims which are to be taken in conjunction with the accompanying drawings.

BRIEF DESCRIPTION OF THE DRAWINGS

The drawings illustrate preferred embodiments of the invention in accordance with the best mode presently contemplated for carrying out the invention.

FIG. 1 is an axial end view of a pulley according to the present invention.

FIG. 2 is a sectional view taken along line 2—2 in FIG. 1.

FIG. 3 illustrates steps of the method of the present invention.

FIG. 4 illustrates an additional step.

FIG. 5 illustrates a still further step.

FIG. 6 is a sectional view similar to FIG. 2 illustrating an additional embodiment of a pulley according to the invention.

FIG. 7 is an enlarged view taken in circle 7 of FIG. 6 and illustrating additional structure which may be incorporated in the pulley of FIG. 6.

FIG. 8 is an axial end view illustrating a further embodiment of pulley according to the present invention.

FIG. 9 is a sectional view taken along line 9—9 in FIG. 8.

DESCRIPTION OF THE PREFERRED EMBODIMENTS

Looking first at FIGS. 1 and 2, there is disclosed a pulley assembly 10 comprising an outer circular rim 12 and a central hub 14. Rim 12 is made according to the method of the invention disclosed in greater detail hereinafter and has a radially outwardly facing circumferential groove 16 which in radial cross section has a general V-shape. Hub 14 comprises a central circular hole 18 having a surrounding circular lip 20 and a plurality of three bolt holes 22 for attachment to a rotating driving or driven member, for example, the external drive wheel on an engine crankshaft. Hub 14 includes a short annular axial flange 24 preferably, although not necessarily, dimensioned to abut the bottom (inner periphery) of the V of rim 12 such that a press, or interference, fit engagement of the hub with the rim is thereby provided. The outer periphery of hub 14 is also preferably shaped to provide an outer peripheral radial flange 26 which abuts one side of groove 16 thereby accurately locating the hub axially of the rim. Even with a press fit, the rim and the hub are preferably affixed by brazing, welding, etc., as at 28. Pulley 10 is shown in use with a drive belt B illustrated in phantom.

Attention is now directed to FIGS. 3, 4 and 5 which illustrate the method by which pulley 10 is constructed. A coiled strip 32 of flat metal is unwound and the unwound portion of the strip is fed through a pair of opposed complementary forming elements, 34 and 36, which can be in the form of draw dies, rollers or the like and which are shaped such that a central longitudinal groove, which is to become groove 16 in the completed rim, is formed in strip 32. Upon exiting from elements 34 and 36, strip 32 is coiled into a plurality of helical convolutions 38. Helical coiling may be done by known techniques such as by suitable design of elements 34 and 36 and/or by additional deflecting means which are not illustrated in the drawing for sake of clarity. Convolutions 38 are cut one at a time from strip 32 as at 40.

FIG. 4 illustrates one such convolution 38 which has been cut from the strip. The ends 39 of the convolution are aligned with each other and then secured together, for example, by butt welding, brazing, etc. This forms the circumferentially continuous one-piece rim 12. Next, as shown in FIG. 5 hub 14 is pressed into rim 12 to complete the pulley construction. It is furthermore contemplated that the formed and coiled strip may be cut in greater than single convolution increments; that is, if the diameter of the uncut helical convolutions 38 is say 8 inches (for example), the strip can be cut so as to provide a one-piece rim for say a ten inch diameter pulley.

It should be noted that the particular shape of the cut 40 may take any one of various possible forms. The cut may be straight as illustrated; the cut may be such that a projecting tab is formed at one end of the convolution and a complementary slot is formed in the opposite end; or the cut may be made in other forms. Furthermore, the particular shape of the groove may be made as desired by suitably constructing elements 34 and 36. Also, single or multiple grooves may be provided. Thus it should be apparent that the invention provides a high degree of versatility and is applicable to numerous specific pulley designs. It will also be appreciated that the invention has the important advantage of requiring a minimum of capital equipment. Thus the invention may be practiced with efficiency and economy. Should changes in the design of the finished pulley be required, such changes can be made with minimum revision to the existing equipment and tooling and this adds further versatility to the invention. This is in marked contrast to other types of pulley constructions which utilize multiple dies and equipment and which involve more extensive modification when design changes in the pulley are made.

FIG. 6 illustrates a further embodiment of pulley 42 according to the present invention. Pulley 42 comprises a two-groove rim 44 and a central hub 46. Hub 46 comprises an outer axial flange 48 which has a press fit engagement with both grooves of rim 44 and includes an out-turned radial flange 50 which accurately locates hub 46 axially of rim 44 as does flange 26 in the pulley of FIGS. 1 and 2. The hub and rim are preferably brazed as at 47. Hub 46 comprises a central circular opening 52 and surrounding lip 54 for journalling on the rotating shaft of a driving or driven member. Alternatively as shown in FIG. 7, a bushing 56 may be inserted into hole 52 and brazed as at 58 to hub 46 for journalling the pulley on a smaller diameter shaft.

FIGS. 8 and 9 illustrate yet another embodiment of pulley 60 in accordance with the present invention. Pulley 60, which in FIG. 8 is illustrated in partially exploded form, comprises a central spoked hub 62 and a two-piece rim composed of rim sections 64 and 66. Rim section 64 is illustrated exploded away. Hub 62 is fashioned with two rows of tabs which project radially outwardly of and around the periphery of hub 62. The tabs in one row are identified by the numeral 68 and those in the other row by the numeral 70. Tabs 68 project axially forwardly while tabs 70 project axially rearwardly. Tabs 68 are interdigitated with tabs 70. Thus the two rows of tabs 68 and 70 provide a rim receiving section which opens radially outwardly to receive the rim sections 66 and 64. Rim sections 66 and 64 are provided by cutting off the strip 32 in half convolution sections. The two half convolution sections 64 and 66 are received into the rim receiving section of hub 62 and the abutting ends thereof are secured together to form a continuous two-piece rim and the rim is secured to hub 62. Hub 62 has a central circular hole, and a tubular bushing 72 passes through the hole and is brazed to hub 62. It will be appreciated in light of the disclosure of FIGS. 8 and 9, that various fractional lengths of a convolution 38 may be cut from the formed strip and these fractional lengths applied to a hub to form the rim. Thus the versatility and adaptability of the invention are even further enhanced.

From the foregoing detailed description of the preferred embodiments, it will be perceived that the invention provides an economical, efficient, versatile pulley construction and method which is adaptable to numerous specific pulley designs. The invention can be practiced with a minimum expenditure in capital equipment, and tooling and changes can be made to the equipment for accommodating changes in pulley design with a minimum of cost and difficulty. Thus the invention provides an important and advantageous improvement in a pulley construction and method.

It is to be understood that the foregoing description is that of preferred embodiments of the invention. Various changes and modifications may be made without departing from the spirit and scope of the invention as defined by the appended claims.

I claim:
1. In a method of making a pulley, the steps which include,
longitudinally advancing a strip of material adjacent a forming element and thereby forming a longitudinal groove in the strip,
coiling the strip into a plurality of generally helical convolutions,
severing successive convolution sections from the strip,
aligning the ends of each severed convolution section and securing the aligned ends of each severed convolution together so as to form a pulley rim,
concentrically arranging the rim relative to an annular pulley hub having an outer peripheral surface provided with a generally radially outwardly extending portion,
moving the rim and hub axially relative to one another to a position wherein one axial side of the rim is abuttingly engaged with the axially outwardly extending portion of the hub and thereby predeterminately axially orienting the rim relative to the hub, and
fixedly securing the rim to the hub in said position.

2. The method of claim 1 which includes the step of dimensioning the rim so as to provide for a press fit when the rim is assembled onto the hub.

3. The method of claim 2 including the step of brazing the hub to the rim.

4. The method of claim 1 which includes the step of forming a V-shaped longitudinal groove in the strip as the strip advances relative to the forming element.

5. The method of claim 4 wherein the V-shaped longitudinal groove is formed midway between the side edges of the strip.

6. The method of claim 1 wherein a pair of longitudinal grooves are formed in the advancing strip by the forming element.

7. The method of claim 1 wherein the longitudinal groove is formed by passing the strip between a pair of opposed complementary shaping rolls disposed on opposite sides of the strip.

8. The method of claim 1 wherein each convolution is severed by a straight transverse cut across the strip.

9. The method of claim 1 wherein the aligned ends of each severed donvolution are secured together by welding.

10. The method of claim 1 wherein each successive convolution section severed from the strip comprises a sufficient length of the strip so as to constitute a complete circular pulley rim.

11. In a method of making a pulley, the steps of: providing a hub having receiving means extending around the periphery thereof for receiving sections of rim, providing a strip of metal, longitudinally advancing the strip, forming a longitudinal groove in the strip as the strip advances, coiling the strip into a plurality of convolutions, severing a fraction of each convolution from the strip, inserting the severed section into said receiving means and inserting a complementary rim section into the remainder of said receiving means to form a continuous rim extending around the hub.

12. The method of claim 11 wherein two half convolutions are severed from the strip and inserted into said receiving means to form the pulley rim.

13. The method of fabricating and assembling a pulley, which includes the steps of:
   forming an annular pulley hub with an outer peripheral surface having a radially extending portion and a generally non-radially extending portion,
   forming an elongated strip of material with a longitudinally extending V-shaped groove,
   coiling the strip into a generally helical configuration consisting of a plurality of uniform convolutions,
   selectively severing the coiled strip so as to provide convolution sections of a length substantially equal to the length of the circumference of the non-radially extending portion of the hub surface and slightly less than the length of the circumference of part of the radially extending portion of the hub surface,
   joining the opposite ends of a convolution section to form a circular pulley rim, the inner diameter of which is substantially equal to the diameter of the non-radially extending portion of the hub surface and smaller than the diameter of at least part of the radially extending portion of the hub surface,
   assembling the rim onto the hub by moving the rim and hub axially of one another until one axial side of the rim abuts against the radially extending portion of the hub surface, and
   fixedly securing the hub and rim together.

14. The method of claim 13 including the step of brazing the hub to the rim.

15. The method of claim 13 which includes the step of dimensioning the rim so as to provide for a press fit between the inner diameter of the rim and the non-radially extending portion of the hub surface.

16. In the method of fabricating and assembling a pulley, the steps which include,
   forming the pulley rim by first passing an elongated flat strip of material through a forming machine whereby the strip is formed into a series of helical convolutions and is also formed with a longitudinal V-shaped groove comprising an intermediate portion and a pair of outwardly extending side portions inclined at a predetermined angle from a plane extending perpendicular to the central axis of the pulley, thereafter severing at least part of a convolution and fixedly securing the opposite ends thereof to one another,
   coaxially orienting the rim with a pulley hub comprising an outer peripheral rim receiving section which includes a first portion of having substantially the same diameter as the inner diameter of the rim intermediate portion, and a second radially and axially outwardly extending portion inclined at substantially the same angle from said plane extending perpendicular to the central axis of the pulley as said first mentioned angle,
   moving the pulley hub and rim axially of one another and thereby inserting the first portion of the pulley hub interiorly of the intermediate portion of the pulley rim until one of the side portions of the pulley rim abuttingly engages the second portion of the pulley hub, whereby the rim and hub are predeterminately axially positioned relative to each other, and
   fixedly securing the rim to the hub while the same are in said predetermined position.

17. The method of claim 16 including the step of brazing the hub to the rim.

18. The method of claim 16 which includes the step of dimensioning the rim so as to provide for a press fit between the first portion of the pulley hub and the intermediate portion of the pulley rim.

19. The method of claim 16 wherein the longitudinal groove is formed by passing the strip between a pair of opposed complementary shaping rolls disposed on opposite sides of the strip.

20. The method of claim 16 wherein the longitudinal groove is formed by passing the strip between a pair of opposed complementary shaping rolls disposed on opposite sides of the strip.

* * * * *

UNITED STATES PATENT OFFICE
CERTIFICATE OF CORRECTION

Patent No. 3,838,485                    Dated October 1, 1974

Inventor(s) William G. Oldford and A. Frederic Warner

It is certified that error appears in the above-identified patent and that said Letters Patent are hereby corrected as shown below:

On the Abstract page, in the first column, "[75] Inventor: William G. Oldford, Lexington, Mich." should be
    --[75] Inventors: William G. Oldford, Lexington, Mich., and
                     A. Frederic Warner, Kawkawlin, Mich.--
Column 4, line 62, "donvolution" should be --convolution--.

Signed and sealed this 18th day of February 1975.

(SEAL)
Attest:

RUTH C. MASON
Attesting Officer

C. MARSHALL DANN
Commissioner of Patents
and Trademarks